United States Patent [19]

Ramirez de Agudelo et al.

[11] Patent Number: 5,229,088
[45] Date of Patent: Jul. 20, 1993

[54] PROCESS FOR RECOVERY OF NICKEL AND MAGNESIUM FROM A NATURALLY OCCURRING MATERIAL

[75] Inventors: Maria M. Ramirez de Agudelo; Milton Manrique; Carlos Seaton; Juan Hurtado, all of Caracas, Venezuela

[73] Assignee: Intevep, S.A., Caracas, Venezuela

[21] Appl. No.: 846,141

[22] Filed: Mar. 5, 1992

[51] Int. Cl.$^5$ .................. C22B 23/00; C22B 26/00
[52] U.S. Cl. .................. 423/150.5; 423/155
[58] Field of Search .......... 423/150, 658.5, 150.5, 423/155

[56] References Cited

U.S. PATENT DOCUMENTS

| | | | |
|---|---|---|---|
| 3,773,891 | 11/1973 | O'Neill | 423/150 |
| 3,804,613 | 4/1974 | Zundel et al. | 423/150 |
| 3,880,981 | 4/1975 | Gringarao et al. | 423/150 |
| 4,125,588 | 11/1978 | Hansen et al. | 423/150 |
| 4,410,498 | 10/1983 | Hatch et al. | 423/155 |
| 4,591,426 | 5/1986 | Krasuk et al. | 208/251 H |

FOREIGN PATENT DOCUMENTS

| | | | |
|---|---|---|---|
| 2134129 | 7/1973 | Fed. Rep. of Germany | 423/150 |
| 256264 | 4/1970 | U.S.S.R. | 423/150 |

Primary Examiner—Wayne Langel
Assistant Examiner—Steven Bos
Attorney, Agent, or Firm—Bachman & LaPointe

[57] ABSTRACT

A process is disclosed for recovering nickel and magnesium from natural material by extracting them in the presence of a spent sulfur containing iron based hydroconversion catalyst, under oxidative conditions.

8 Claims, 1 Drawing Sheet

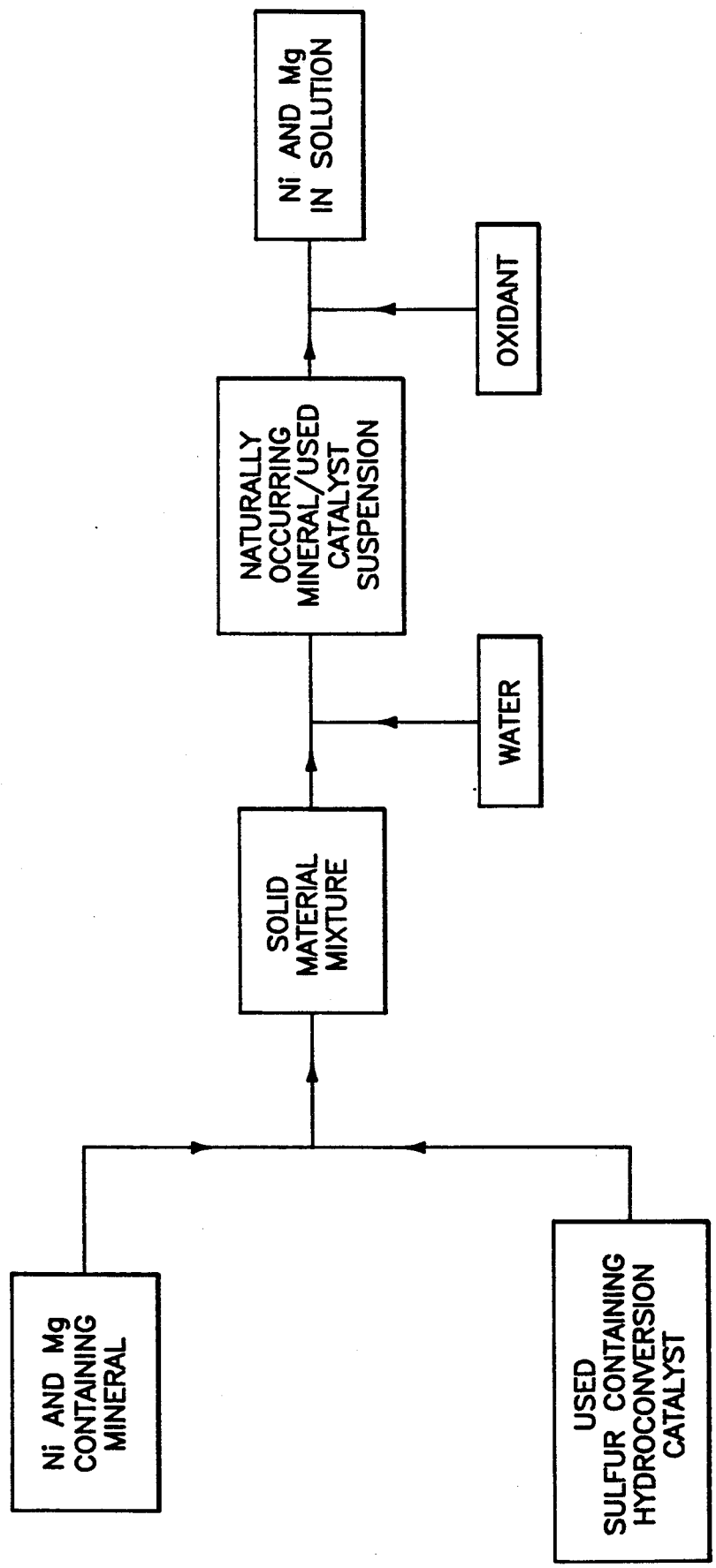

PROCESS FOR RECOVERY OF NICKEL AND MAGNESIUM FROM A NATURALLY OCCURRING MATERIAL

BACKGROUND OF THE INVENTION

The invention pertains to a process for recovery of nickel and magnesium from a naturally occurring material.

Various hydrometalurgical processes for extracting nickel from nickel bearing metals are known in the art. For example, U.S. Pat. No. 4,435,369 to Simpson discloses a process whereby nickel bearing metals are contacted in an extraction zone with an aqueous solution having a concentration of chloride ions, metal ions and sulfuric acid at an elevated temperature. This procedure yields a nickel recovery of approximately 70%. Unfortunately, the materials necessary for this procedure, namely the sulfuric acid and metal and chloride ions, are costly and thus limit the application of this procedure to use on nickel bearing metals having a sufficiently high portion of nickel to make the procedure economically feasible. Further, the procedure disclosed in U.S. Pat. No. 4,435,369 requires the addition of magnesium in the extraction zone to improve the results of the procedure.

Several other methods of hydrometalurgical processes, discussed in U.S. Pat. No. 4,435,369, similarly have poor recovery percentages which limit the use of such processes to applications where the nickel content of the nickel bearing ore must be sufficiently high to make the procedure economically feasible.

Magnesium is an additional metal which would preferably be extracted during the process, rather than being required as an additive to the process in order to improve the recovery of nickel.

Accordingly, it is a principal object of the present invention to provide a process for recovery of both nickel and magnesium from naturally occurring materials whereby the cost of the procedure is reduced to allow application of the process to nickel and magnesium bearing metals having a much lower content of these metals. Due to the reduced cost of the extraction materials of the disclosed invention, as well as the improved efficiency of the process, metals having a low content of nickel and magnesium can be treated in a commercially feasible manner to extract these metals.

Hydroconversion treatments of heavy hydrocarbon oils frequently result in production of spent catalysts which have high sulfur content and which are also iron based. Typical iron based catalysts used in these processes are disclosed in U.S. Pat. Nos. 3,936,371 to Ueda et al., U.S. Pat. No. 4,066,530 to Aldridge et al., and U.S. Pat. No. 4,591,426 to Krasuk et al. It would therefore also be desirable to provide a use for such spent hydroconversion iron based catalysts which does not involve costly procedures for its safe disposal.

It is therefore a further object of the present invention to provide a use for these spent hydroconversion catalysts in the presently disclosed process for recovery of nickel and magnesium.

SUMMARY OF THE INVENTION

The improved process for recovery of nickel and magnesium from naturally occurring material comprises the steps of: providing a spent iron based catalyst having a sulfur content of at least 10% by weight; providing a naturally occurring material having a nickel content of at least 0.1% by weight and a magnesium content of at least 0.1% by weight; admixing the catalyst and the material in a ratio of catalyst to material in the range of 1:2-8:1 by weight to form a mixture; forming a suspension of the mixture in water having a pH no greater than 4; subjecting the suspension to an elevated temperature and an elevated pressure; and injecting an oxidant into the suspension at a rate sufficient to maintain a substantially homogeneous distribution of catalyst, material and oxidant in the suspension, whereby nickel and magnesium are extracted from the material into the solution. Standard and known in the art techniques can then be used to extract the nickel and magnesium from the solution.

The spent catalyst and material are preferably powdered prior to the operation to an average particle diameter of 200 microns or less.

The preferable content of iron in the spent catalyst falls in the range of 20-70% by weight as Fe, while it is also preferable to have at least 15% by weight of sulfur content.

BRIEF DESCRIPTION OF THE DRAWING

A detailed description of the invention will now be given, with reference to the accompanying FIG. 1 which shows a block diagram illustrating the process of the present invention.

DETAILED DESCRIPTION

The drawing illustrates the several stages which comprise the overall process for recovery of nickel and magnesium from metal ores, according to the invention.

As previously discussed, the preferred source of metal ions and sulfur is a spent or used sulfur containing iron based hydroconversion catalyst. This catalyst is preferably iron based, having a composition of iron in the range of 20-70% by weight of Fe. The spent catalyst also preferably includes a sulfur content in the range of 10-40%. Prior to use, the spent catalyst is preferably powdered to an average particle size of 200 microns or less, in order to insure a good reaction during the contacting procedure. The material to be treated may be a typical nickel and magnesium bearing metal ore such as serpentine or olivine. The metal ore preferably has a nickel content of at least 0.1% by weight, and also has a magnesium content of at least 0.1% by weight. The content of nickel and magnesium in these metal based ores more preferably falls in the range, respectively, of 0.1-10.0% by weight and 0.1-30% by weight.

Prior to being mixed with the spent catalyst, the material is also preferably powdered to an average particle size of 200 microns or less in order to insure a good reaction with the spent catalyst during the contacting procedure. The spent catalyst and marterial are then admixed into a solid material mixture having a ratio by weight of catalyst to material of 1:2-8:1. The mixture ratio more preferably falls within the range of 1:1-5:1. At these ratios, it has been discovered that the recovery percentage of nickel and magnesium greatly exceeds the recovery percentages obtained by the prior art processes. The solid material mixture is then added to a water solution to form a suspension having a pH no greater than 4. At a pH higher than 4, the desired chemical reaction during the contacting procedure may be inhibited, and other undesirable reactions take place which result in production of a mix of solids.

An oxidant is then added to the suspension under controlled conditions so as to avoid a "boiling" of the particulate material and water contained in the suspension. Such a "boiling" could entail the loss of either particulate material or water, which could result in variation of the pH of the reaction medium and adverse effects on the contacting procedure. Further, the injection rate of the oxidant should be sufficient to maintain a substantial homogeneity between the spent catalyst, metal and oxidant. During this reaction, the temperature is elevated to a range of 50°-350° C., and the pressure is also elevated to a range of 200-600 psi. More preferable ranges for the temperature and pressure, respectively, are 150°-300° C. and 300-500 psi.

During the subjection of the mixture to the elevated temperature and pressure, iron will displace the magnesium and nickel, which will go into the liquid solution. This nickel and magnesium can then be removed from the solution by standard procedures which are known in the art. Through such procedures, the expected recovery is higher than 85% for the nickel content and 90% for the magnesium content of the metal.

The oxidant to be used in the process is preferably either oxygen, air, or a mixture of the two.

The composition of typical materials to be treated by such a process is indicated below in Table I.

TABLE I

| Mineral | Percentage by Weight |
|---|---|
| Ni | 0.1-20 |
| Fe | 0.1-30 |
| Si | 0.1-40 |
| Al | 0.1-40 |
| Mg | 0.1-40 |

Compositions such as these are typically found in silicates such as olivine, cordierite, pyroxene, amphibole, kaolinite, serpentine, clays and the aluminates.

A typical procedure according to the invention will be illustrated in the example below.

EXAMPLE

For this example, the spent catalyst used was a naturally occurring iron material which was used during a hydroconversion process of heavy oils. The chemical composition of this spent catalyst is given below in Table II.

The nickel and magnesium containing laterite ore of serpentine type was obtained from the Loma de Hierro reservoir in Western Venezuela. Its chemical composition is also given below in Table II.

TABLE II

| | Catalyst | | Laterite | |
|---|---|---|---|---|
| S | 21.3 | wt % | 0 | wt % |
| C | 30.6 | wt % | 0 | wt % |
| Ni | 1984 | ppm | 1.95 | wt % |
| Fe | 54.5 | wt % | 6.57 | wt % |
| V | 9968 | ppm | 0 | ppm |
| Si | 4797 | ppm | 13.81 | wt % |
| Al | 8141 | ppm | 4150 | ppm |
| Mg | 0 | wt % | 17.6 | wt % |

Several mixtures of this spent catalyst and metal ore were prepared and treated according to the procedure described above. These samples were prepared at various different ratios of catalyst to ore as shown below in Table III.

TABLE III

| | Extraction (%) | |
|---|---|---|
| Catalyst/Mineral Ratio | Ni | Mg |
| 0/1 | 0 | 0 |
| 2/1 | 73.7 | 83.2 |
| 3/1 | 81.9 | 87.5 |
| 4/1 | 87.3 | 92.0 |

A blank experiment, wherein the catalyst to ore ratio was 0:1 indicated a 0% extraction of nickel and magnesium. Further, it was apparent that as the ratio of catalyst to ore increased from 2:1 to 4:1, the recovery percentages of nickel and magnesium increased. Specifically, at a catalyst to ore ratio of 4:1, nickel was extracted at the rate of 87.3% and magnesium was extracted at the rate of 92%. Clearly this compares favorably with the recovery percentages obtained in the processes disclosed in the prior art, and provides a further desirable result in that the source of iron and sulfur is a waste spent catalyst rather than materials purchased specifically for the procedure, magnesium is recovered rather than injected, and the extraction ratios are greatly improved.

This invention may be embodied in other forms or carried out in other ways without departing from the spirit or essential characteristics thereof. The present embodiments are therefore to be considered as in all respects illustrative and not restrictive, the scope of the invention being indicated by the appended claims, and all changes which come within the meaning and range of equivalency are intended to be embraced therein.

What is claimed is:

1. A process for recovering nickel and magnesium from a naturally occurring material, comprising the steps of:
   (1) providing a spent iron based hydroconversion catalyst having a sulfur content of at least 10% by weight;
   (2) providing a naturally occurring material having a nickel content of at least 0.1% by weight and a magnesium content of at least 0.1% by weight;
   (3) admixing the catalyst and the material in a ratio of catalyst to material in a range of 1:2-8:1 by weight to form a mixture;
   (4) adding water in an amount sufficient to form a suspension of the mixture in water having a pH no greater than 4;
   (5) subjecting the suspension to an elevated temperature and an elevated pressure; and
   (6) injecting an oxidant into the suspension at a rate sufficient to maintain a substantially homogeneous distribution of catalyst, material, and oxidant in the suspension, whereby nickel and magnesium are extracted from the material into the solution.

2. A process according to claim 1, wherein the catalyst has an Fe content of 20-70% by weight.

3. A process according to claim 1, wherein the sulfur content is at least 15% by weight.

4. A process according to claim 1, further comprising the step of powdering the catalyst and the material to an average particle diameter of 200 microns or less.

5. A process according to claim 1, wherein the ratio of catalyst to material is in a range of 1:1-5:1.

6. A process according to claim 1, wherein the elevated temperature is in a range of 50°-350° C. and the elevated pressure is in a range of 200-600 psi.

7. A process according to claim 1, wherein the elevated temperature is in a range of 150°-300° C. and the elevated pressure is in a range of 300-500 psi.

8. A process according to claim 1, wherein the oxidant is selected from the group consisting of air, oxygen, and mixtures thereof.

* * * * *